United States Patent [19]

Wright

[11] Patent Number: 5,300,223
[45] Date of Patent: Apr. 5, 1994

[54] QUICK CONNECT/DISCONNECT OIL FILTER

[75] Inventor: Allen B. Wright, Coventry, R.I.
[73] Assignee: Allied-Signal Inc., Morristown, N.J.
[21] Appl. No.: 825,693
[22] Filed: Jan. 27, 1992
[51] Int. Cl.⁵ .................... B01D 27/08; B01D 27/10
[52] U.S. Cl. ................... 210/232; 210/248; 210/443
[58] Field of Search .............. 210/232, 238, 248, 440, 210/443, 444

[56] References Cited

U.S. PATENT DOCUMENTS

| 1,840,883 | 5/1930 | Brecher | 210/232 |
| 3,225,929 | 12/1965 | Sicard | 210/444 |
| 3,300,049 | 1/1967 | Hardcastle | 210/232 |
| 3,490,594 | 1/1970 | Hutchins, Jr. | 210/444 |
| 3,513,979 | 5/1970 | Miller et al. | 210/232 |
| 4,052,307 | 10/1977 | Humbert, Jr. | 210/130 |
| 4,371,439 | 2/1983 | Thornton | 210/232 |
| 4,477,347 | 10/1984 | Sylva | 210/232 |
| 4,719,012 | 1/1988 | Groezinger et al. | 210/232 |
| 4,764,275 | 8/1988 | Rohichaud | 210/232 |
| 4,767,530 | 8/1988 | Gilliam | 210/232 |
| 5,084,162 | 1/1992 | Conti | 210/232 |

FOREIGN PATENT DOCUMENTS 2252694  5/1973  Fed. Rep. of Germany ...... 210/444

Primary Examiner—Matthew O. Savage
Attorney, Agent, or Firm—Ken C. Decker; W. N. Antonis

[57] ABSTRACT

A filter assembly includes a base and a filter cartridge removably mounted on the base. The filter cartridge is held in place on the base by a first set of latching members or fingers. When the cartridge is to be changed, a clipping ring from which the fingers extend is rotated relative to the base, urging the fingers up a camming surface to thereby release the first set of fingers and allow the seal between the cartridge and base to be broken, while the cartridge is retained on the base by a longer second set of fingers. Upon additional rotation of the clipping ring, the longer fingers are released, thereby permitting removal of the cartridge from the base.

4 Claims, 3 Drawing Sheets

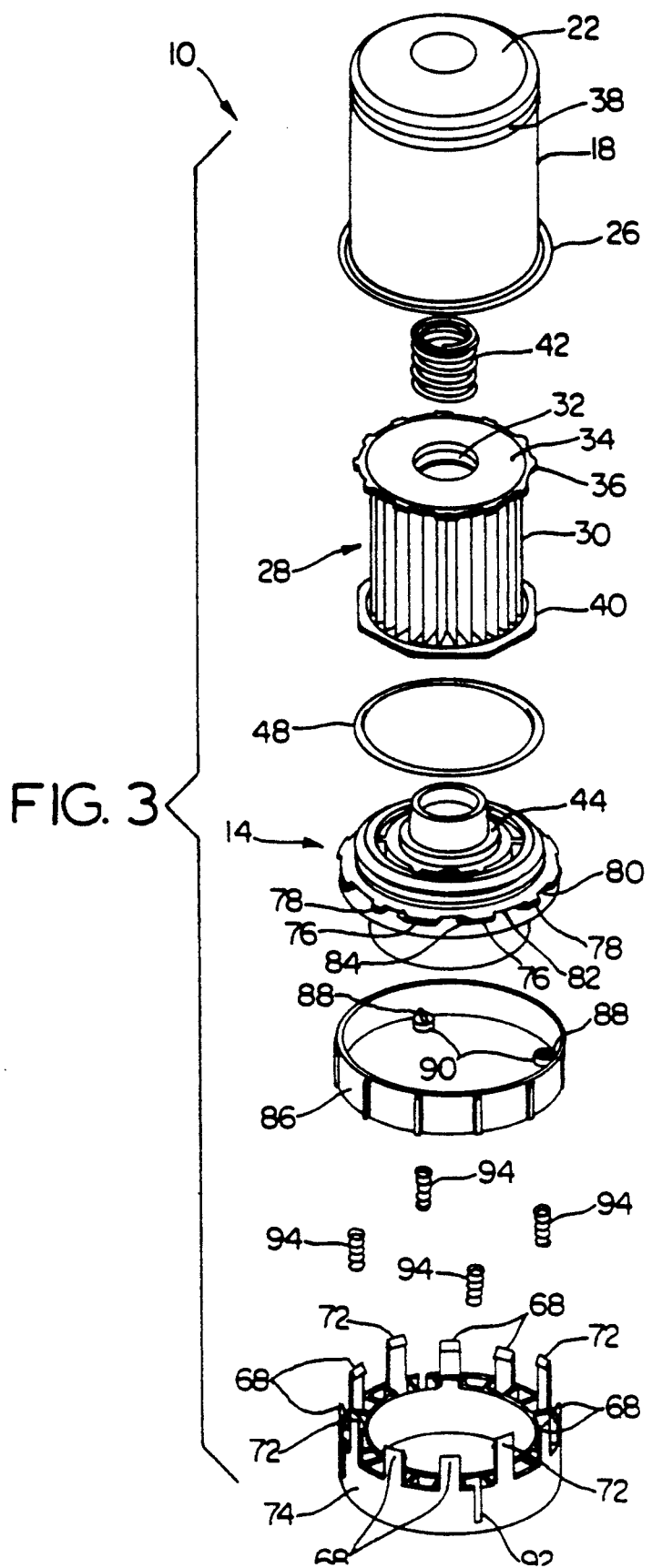

QUICK CONNECT/DISCONNECT OIL FILTER

This invention relates to a liquid filter.

Existing liquid filters used for filtering, for example, the lubricating oil of the engine of an automotive vehicle, are usually the so-called "spin-on" type in which the filter housing is provided with a threaded outlet opening which is engaged with a mounting stud extending from a mounting surface of the vehicle engine. The filter housing also carries a gasket which circumscribes the threaded opening and which is tightened against the mounting surface on the engine to provide a seal which prevents leakage of the lubricating oil. Spin-on filters used for filtering engine lubricating oil also include a relief valve, which opens to permit lubricating oil to bypass around the filter element when the pressure differential across the filter element becomes too high, and an anti-drainback valve, which prevents lubricating oil from draining out of the filter when the engine is turned off. Both of these valves are thrown away with the filter when the filter is changed. Furthermore, it is difficult to dispose of prior art spin-on filters in an environmentally safe manner since it is difficult to remove the filter element and lubricating oil from the metal filter housing. Accordingly, many spin-on oil filters are simply discarded in landfills.

The present invention provides a mounting base which is installed on the engine and an open ended filter cartridge which is installed on the base and is retained thereon by a quick connect/disconnect connection. The relief valve and anti-drainback valve are provided in the base, so that they are not replaced each time the cartridge is replaced. The filter element and used lubricating oil remaining in the cartridge may be removed from the housing after the cartridge is removed from the mounting base. The quick connect/disconnect connection permits a two stage removal so that the filter is retained on the base after the seal between the cartridge and the base is broken, thereby permitting the cartridge to depressurize while it is still attached to the engine. This acts as a safety feature in the event of attempted removal of the filter cartridge while the engine is still running. Since both the relief valve and the anti-drainback valve are reused, substantial resource savings are inherent. Furthermore, the heavy steel tapping plate which closes the open end of prior art spin-on filters and which is threaded on the aforementioned mounting stud is not necessary in the filter according to the present invention, thereby resulting in additional resource savings. Furthermore, the seal between the cartridge and the base is effected by a simple 0-ring pressure seal, instead of the gasket used in prior art spin-on filters. Accordingly, a more positive seal is attained. Finally, the quick connect/disconnect mechanism allows faster changing of the filter as compared to existing spin-on filters.

These and other advantages of the present invention will become apparent from the following description, with reference to the accompanying drawings, in which:

FIG. 3 is an exploded perspective view of the filter assembly according to the present invention.

Figure 1:
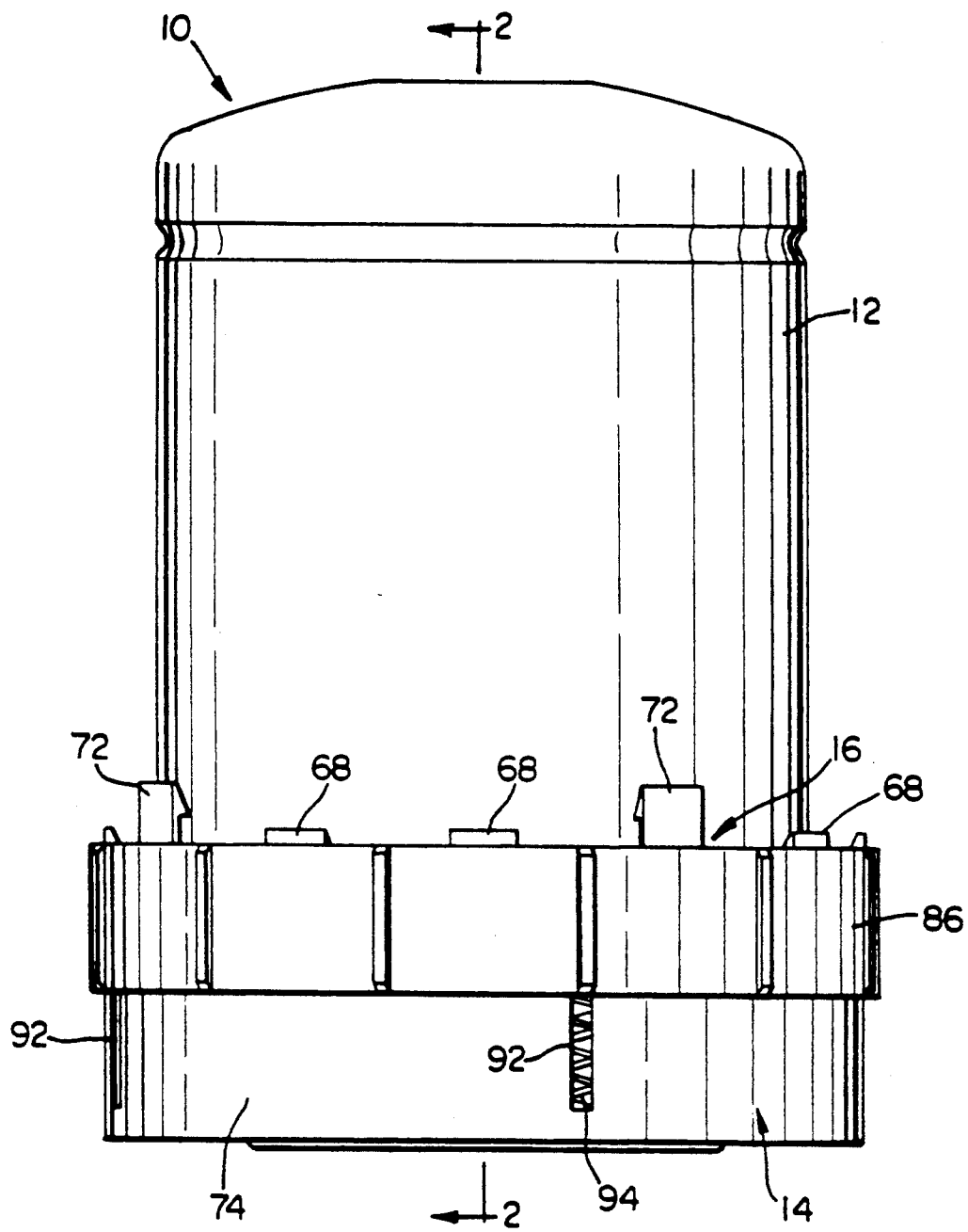
FIG. 1 is a side elevational view of a liquid filter assembly made according to the present invention.

Referring now to the drawings, a liquid filter assembly generally indicated by the numeral 10 includes a cartridge 12 which is releasably mounted on a base 14. A quick connect/disconnect retaining mechanism, generally indicated by the numeral 16, releasably retains the filter cartridge 12 on the base 14. The cartridge 12 includes a cup-shaped metal housing generally indicated by the numeral 18. The housing 18 includes a circumferentially extending wall 20, a dome-shaped end 22, and an open end 24. A radially projecting, circumferentially extending flange 26 circumscribes the open end 24.

Figure 2:
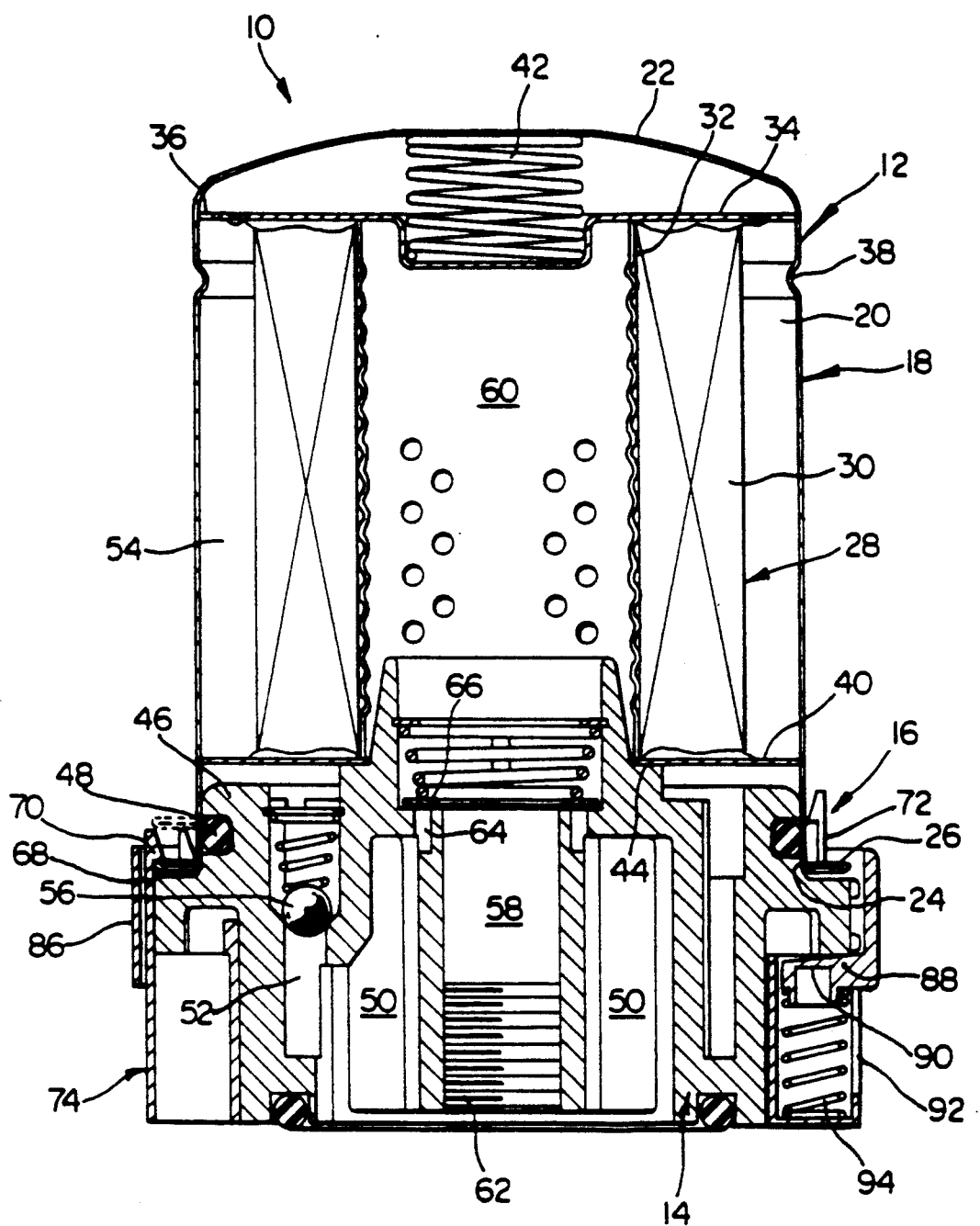
FIG. 2 is a cross-sectional view taken substantially along lines 2—2 of FIG. 1.

A filter element generally indicated by the numeral 28 is received within the housing 18 through the open end 24. Element 28 includes a circumferentially extending array of pleated filter paper 30 which circumscribes a perforated metal centertube 32, which resists radially inward collapse of the pleats comprising the array 30. The array is bounded by an upper end cap 34, which closes the tops of the pleats 30 and also closes the top of the centertube 32. Radially extending tabs 36 hold filter element 28 within the housing 18 when the latter is removed from the base 14 by engaging the bead 38 formed on circumferentially extending wall 20. The projections or tabs 36, however, yield when the filter element 28 is installed within the housing 18. A lower open end cap generally indicated by the numeral 40 closes the lower edges of the pleats comprising the array 30. A spring 42 between the dome end 22 and the end cap 34 yieldably urges the filter element 28 downwardly viewing FIG. 2.

The base 14 includes a circumferentially extending supporting surface 44. When the cartridge 12 is installed on the base 14, the spring 42 loads the element 28 against the surface 44. The base 14 further includes a projecting portion 46 which is received within the open end 24 and slidably engages the circumferentially extending wall 20. Projecting portion 46 carries a circumferentially extending O-ring seal 48 which circumscribes the projecting portion 46 and sealingly engages the circumferentially extending wall 20. Inlet passages 50 are provided in the base 14 which communicate with a passage 52 which communicates the inlet passages 50 with inlet chamber 54 defined between the outer tips of the pleats comprising the array and the circumferentially extending wall 20. A check-valve 56 is provided in the passage 52 and permits flow of fluid into the inlet chamber 54, but prevents flow of liquid out of the inlet chamber 54. Accordingly, check valve 56 acts as an anti-drainback valve to prevent lubricating oil from draining from inlet chamber 54 when the vehicle is turned off. It will be noted that the check valve 56 is a permanent fixture which is mounted in the base 14 and thus is not changed every time that the filter cartridge is changed.

The base 14 is further provided with an outlet passage 58 which communicates with the outlet chamber 60 defined within the centertube 32. Accordingly, lubricating oil communicates through the inlet passages 50 through the passage 52 and the check valve 56 and into the inlet chamber 54. Lubricating oil then passes through the array 30, where contaminants entrained in the fluid are removed. The fluid then passes into the perforated centertube 32 which defines the outlet chamber 60. Lubricating oil is communicated from the outlet chamber 60 back into the engine through the outlet passage 58. Outlet passage 58 may be provided with threads 62 to permit the base 14 to be "spun-on" a conventional spin-on filter mounting stud so that the filter 10 may be retrofitted on existing vehicles. Of course, the base 14 would remain on the vehicle when the filter cartridge 12 is changed. Alternatively, the base 14 may be designed into new engines. A bypass passage 64 communicates the inlet passages 50 directly to the outlet passage 58. The bypass passage 64 is normally closed by spring loaded relief valve 66. However, when the pressure differential between the inlet passages 50 and the outlet passages 58 exceeds a predetermined level, the relief valve 66 cracks open to permit flow of liquid to bypass the filter element 28.

The retaining mechanism 16, which retains the filter cartridge 18 on the base 14, consists of a first set of circumferentially spaced, axially extending latch members or fingers 68. Each of the fingers 68 terminate in a barb 70 which engages the flange 26 to retain the cartridge 12 on the base 14. It will be noted that a second set of latch members or fingers 72, which are identical to the fingers or latch members comprising the first set 68 except that they are significantly longer, are interposed between the fingers 68 of the first set of latch members. The latch members 72 comprising the second set do not normally hold the filter cartridge on the base 14, but are used when the filter cartridge is being removed, as will hereinafter be explained. As can be seen from FIG. 3, the longer latch members 72 comprising the second set are interspersed among the latch members 68 comprising the first set such that every third latch member is a longer latch member or finger comprising the second set of latch members. Each of the latch members 68, 72 project axially from a clipping ring 74 which circumscribes the base 14 and is rotatable relative thereto.

A first set of radially projecting, circumferentially extending cam surfaces 76 project from the outer circumferential surface of the base 14. Similarly, a second set of camming surfaces 78 are interspersed between the surfaces 76, there being one of the surfaces 78 for every two of the camming surfaces 76. The surfaces 76 and 78 are identical, except that the circumferential length of the surface 76 is substantially greater than that of the surfaces 78. The camming surfaces 76, 78 are separated by short circumferentially extending gaps 80 and by longer gaps 82. The shorter latch members or fingers 68 are located in the smaller gaps 80 when the cartridge 12 is installed on the base 14, and the longer set of fingers or latch members 72 are disposed in the wider gaps 82.

Each of the surfaces 76, 78 include an upwardly projecting ramp 84. Accordingly, when the cartridge 12 is installed on the base 14, each of the fingers or latch members 68 or 72 are disposed in their corresponding grooves 80 or 82. However, upon rotation of the clipping ring 74 relative to the base 14, the shorter fingers 68 are engaged with camming surfaces 76 while the longer fingers 72 remain in their grooves 82. Accordingly, engagement of the camming surfaces 76 with the fingers or latch members 68 forces the latter radially outwardly, thereby driving the corresponding barb 70 away from the flange 26, permitting the cartridge 12 to drop away from the base 14 until the flange 26 is engaged with the barbs 70 on the longer latch members or fingers 72. Accordingly, the flange 26 will be moved to the position illustrated by the dashed lines FIG. 2, such that the sealing connection between the seal 48 and the circumferentially extending wall 20 is broken. Accordingly, if the inlet chamber 54 is pressurized, the lubricating oil in chamber 54 will leak out of the housing due to the fact that the sealing connection has been broken.

Upon rotation of the clipping member 74 past this intermediate position, the longer fingers will ride up the ramps 84 of the camming surfaces 78 as the clipping ring is rotated towards its fully actuated position. As this occurs, the longer set of latch member or fingers 72 will be forced radially outwardly until their barbs are moved away from the flange 26, thereby permitting removal of the cartridge.

Rotation of the clipping member 74 is effected by a locking ring 86. The locking ring 86 circumscribes the base 14 and clipping ring 74, and is provided with four circumferentially spaced, radially inwardly projecting struts 88 which terminate in bosses 90. The struts 88 extend through corresponding circumferentially spaced, axially extending slots 92 in the clipping ring 74. A set of four circumferentially spaced springs 94 extend between the clipping ring 74 and the bosses 90, thereby urging the locking ring 86 upwardly, viewing FIG. 2, into a position where it circumscribes the fingers 68, 72. When the locking ring is in this position, the fingers 68, 72 cannot be accidentally jarred outward, so that the cartridge 12 will be locked in place. When the clipping ring 74 is to be rotated to release the cartridge, the locking ring 86 is manually moved downwardly, viewing FIG. 2, downward movement being permitted by the slots 92. After the locking ring 86 is moved downwardly, the locking ring can be used to rotate the clipping ring.

I claim:

1. Filter assembly comprising a base and a filter cartridge for installation on said base, said filter cartridge including a filter element mounted within a cup-shaped housing having a circumferentially extending wall and an open end, said element being installed in said housing through said open end, said base having an axially projecting portion slidably received within said open end of the housing, said axially projecting portion carrying a circumferentially extending seal sealingly engaging said circumferentially extending wall, an element engaging surface defined on said projecting portion for sealingly engaging said element, and manually actuated retaining means for retaining the cartridge on said base, said retaining means including means for disengaging the sealing connection between the cartridge and the base to permit the sealing connection between the seal and the cartridge to be broken while retaining the cartridge on the base and thereafter permitting removal of the cartridge from the base, said manually actuated retaining means including a manually actuated member movable from a retaining position in which the cartridge is sealingly retained on said base to an intermediate position in which the cartridge is retained on said base but the sealing connection between cartridge and base is broken and from said intermediate position to a fully released position in which the cartridge may be removed from the base, said retaining means include circumferentially spaced deflectable latch members engaging said filter cartridge, and a camming means for deflecting said latch members, said latch members including a first set of latch members maintaining said cartridge housing in sealing engagement with said base and a second set of latch members retaining said cartridge on said base but without sealing engagement with the base, said camming means including first releasing means for releasing said first set of latch members from said cartridge when the manually actuated member is moved to the intermediate position and second releasing means for releasing said second set of latch members when the manually actuated member is moved to the fully released position.

2. Filter assembly as claimed in claim 1, wherein said latch members are fingers extending axially with respect to said filter cartridge, the fingers comprising said second set of latch members being longer than the fingers comprising said first set of latch members.

3. Filter assembly as claimed in claim 2, wherein said first and second releasing means include circumferentially spaced cams projecting from said base for engagement by said fingers, the cams actuating the fingers comprising said first set of latch members having a longer circumferential length than the cams actuating the fingers comprising the second set of latch members.

4. Filter assembly as claimed in claim 1, wherein said first and second releasing means include circumferentially spaced cams projecting from said base for engagement by said latch members, the cams actuating the first set of latch members having a longer circumferential length than the cams actuating the second set of latch members.

* * * * *